United States Patent
Al-Qasim et al.

(10) Patent No.: US 11,572,747 B1
(45) Date of Patent: Feb. 7, 2023

(54) METHOD AND DRILLING SYSTEM FOR MITIGATING LOST CIRCULATION WITH BASALTIC PARTICLES

(71) Applicant: SAUDI ARABIAN OIL COMPANY, Dhahran (SA)

(72) Inventors: Abdulaziz S. Al-Qasim, Dammam (SA); Ali A. Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/454,251

(22) Filed: Nov. 10, 2021

(51) Int. Cl.
| E21B 21/00 | (2006.01) |
| C09K 8/05 | (2006.01) |
| C09K 8/504 | (2006.01) |
| E21B 43/26 | (2006.01) |

(52) U.S. Cl.
CPC ............. *E21B 21/003* (2013.01); *C09K 8/05* (2013.01); *C09K 8/5045* (2013.01); *E21B 43/26* (2013.01)

(58) Field of Classification Search
CPC ......... E21B 21/003; E21B 43/26; C09K 8/05; C09K 8/5045
See application file for complete search history.

(56) References Cited

U.S. PATENT DOCUMENTS

| 9,074,125 B1 | 7/2015 | Lahalih | |
| 2008/0083529 A1* | 4/2008 | Hall | F16L 15/006 166/66 |
| 2010/0305864 A1* | 12/2010 | Gies | E21B 47/01 702/9 |
| 2016/0264842 A1* | 9/2016 | Miller | E21B 33/14 |
| 2017/0190955 A1* | 7/2017 | Mahmoud | C09K 8/845 |
| 2018/0265764 A1 | 9/2018 | Hussein et al. | |
| 2019/0241789 A1* | 8/2019 | Agapiou | C09K 8/905 |

OTHER PUBLICATIONS

Gíslason, Sigurdur R., et al., "A brief history of CarbFix: Challenges and victories of the project's pilot phase", ScienceDirect Energy Procedia 146, pp. 103-114, 2018 (12 pages).
Matter, Juerg M., et al., "Rapid carbon mineralization for permanent disposal of anthropogenic carbon dioxide emissions", Science, vol. 352, Issue 6291, pp. 1312-1314, Jun. 10, 2016 (4 pages).

* cited by examiner

*Primary Examiner* — Silvana C Runyan
(74) *Attorney, Agent, or Firm* — Osha Bergman Watanabe & Burton LLP

(57) ABSTRACT

A method of mitigating lost circulation in a subterranean wellbore for oil and gas includes introducing basaltic particles and a carbonated mixture to the lost circulation zone of the subterranean wellbore, contacting the basaltic particles with the carbonated mixture, dissolving at least a part of the basaltic particles with the carbonated mixture, reacting divalent cations with the carbonate anions in the carbonated mixture to produce carbonate minerals, providing stimulus to the basaltic particles and the carbonated mixture, depositing at least a part of the carbonate minerals to fractures of the lost circulation zone, monitoring the reacting and depositing; and optionally repeating one or more of the aforementioned steps. A drilling system for oil and gas extraction includes basaltic particles, a carbonated mixture, at least one stimulus generator, and a mitigation device.

17 Claims, 16 Drawing Sheets

METHOD AND DRILLING SYSTEM FOR MITIGATING LOST CIRCULATION WITH BASALTIC PARTICLES

BACKGROUND

Various challenges are encountered during drilling and production operations of a well. For example, fluids used in drilling, completion, or servicing of a wellbore can be lost to the subterranean formation while circulating the fluids in the wellbore. In particular, the fluids may enter the subterranean formation via depleted zones, zones of relatively reduced pressure (as compared to the wellbore), zones having naturally occurring fractures, or having fracture gradients exceeded by the hydrostatic pressure of the drilling fluid, and so forth.

The extent of fluid losses to the formation may range from minor losses (for example, less than 10 barrels/hour (bbl/hr)), also referred to as seepage loss, to severe losses (for example, greater than 100 bbl/hr), to even greater amounts, such as where fluid fails to return to the surface, also referred to as complete fluid loss. As well, the type of degree fluid loss may differ depending on the type of fluid in the wellbore. The degree of loss for oil- and synthetic oil-based muds are considered more significant at reduced amounts versus the same quantity for water-based muds due to the potential economic and environmental impacts.

Lost circulation can be encountered during any stage of operations. Lost circulation occurs when drilling fluid (or drilling mud) pumped into a well returns partially or does not return to the surface. While a small amount of fluid loss may be expected, excessive fluid loss is not desirable from a safety, an economical, or an environmental point of view. This is especially true when working with water-bearing formations, such as aquifers that have drinking quality fresh or mineral water, or such as brine- or formation water-bearing formations, which may contaminate hydrocarbon production, cause corrosion issues, and foul cementing jobs. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time for a drilling operation. In extreme cases, lost circulation problems may force abandonment of a well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of mitigating lost circulation in a subterranean wellbore for oil and gas extraction. The method may include introducing basaltic particles and a carbonated mixture to the lost circulation zone of the subterranean wellbore, contacting the basaltic particles with the carbonated mixture, dissolving at least a part of the basaltic particles with the carbonated mixture, reacting divalent cations with the carbonate anions in the carbonated mixture to produce carbonate minerals, providing stimulus to the basaltic particles and the carbonated mixture, depositing at least a part of the carbonate minerals to fractures of the lost circulation zone, monitoring the reacting and depositing; and optionally repeating one or more of the aforementioned steps.

In another aspect, embodiments disclosed herein relate to a drilling system for oil and gas extraction comprising a drill string comprising a bottom hole assembly comprising a drill bit and one or more drilling tools, a mitigation device disposed on the drill string, and a fluid circulation system configured to introduce at least one of carbonated mixture and basaltic particles into a wellbore. The mitigation device may be stationary or mobile, and may include basaltic particles, a stimulus generator, wheels/bearings, a retrieval/deployment line, and sensors.

Other aspects and advantages of the claimed subject matter will be apparent from the following description and the appended claims.

DETAILED DESCRIPTION

Figure 1:
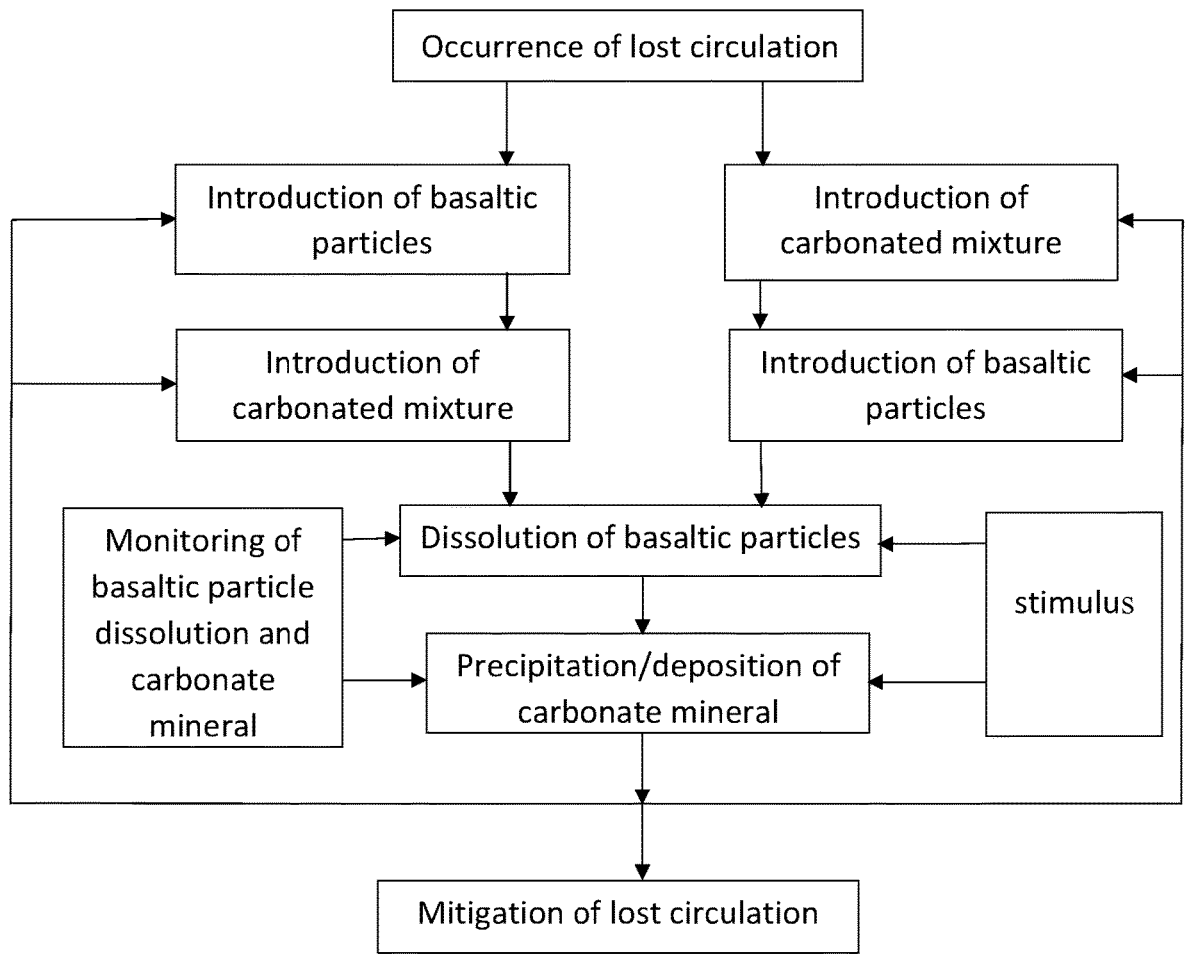
FIG. 1 is a flow diagram that illustrates steps included in the method of mitigating lost circulation in accordance with one or more embodiments.

In one aspect, embodiments disclosed herein relate generally to a method of mitigating lost circulation in a subterranean wellbore for oil and gas extraction. The method may include introducing basaltic particles and a carbonated mixture to the lost circulation zone of the subterranean wellbore, contacting the basaltic particles with the carbonated mixture, dissolving at least a part of the basaltic particles with the carbonated mixture, reacting divalent cations with the carbonate anions in the carbonated mixture to produce carbonate minerals, providing stimulus to the basaltic particles and the carbonated mixture, depositing at least a part of the carbonate minerals to fractures of the lost circulation zone, monitoring the reacting and depositing; and optionally repeating one or more of the aforementioned steps. FIG. 1 is a flow diagram illustrating the steps included in the method of mitigating lost circulation in accordance with one or more embodiments. The details of each step included in the method is described further below.

Figure 2:
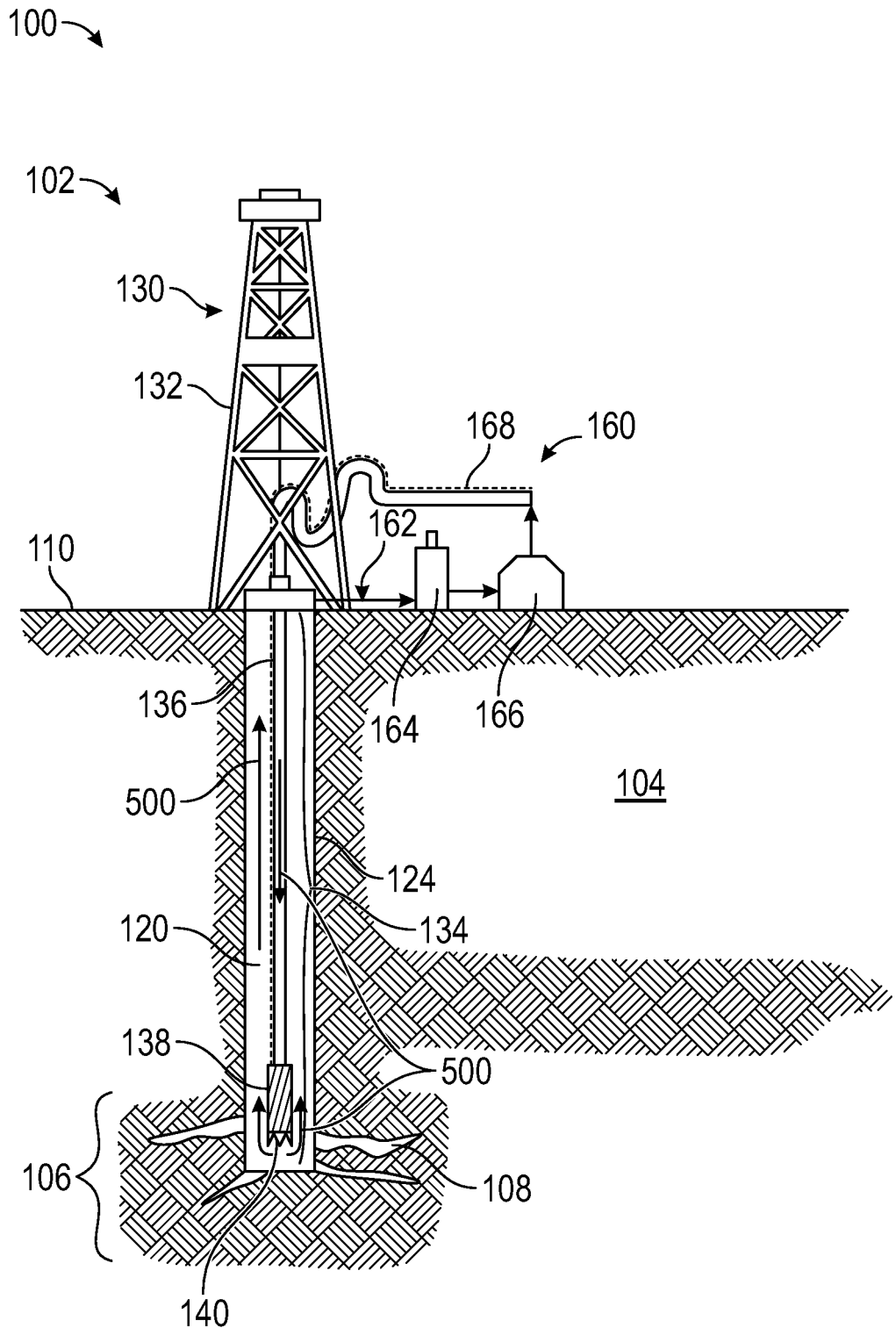
FIG. 2 is a diagram that illustrates a well environment of oil and gas extraction in accordance with one or more embodiments.

FIG. 2 is a diagram that illustrates a well environment 100 in accordance with one or more embodiments. The well environment 100 includes a well system 102 and a subsurface formation 104 ("formation").

The formation 104 may include a porous or fractured rock formation that resides underground, beneath the surface 110 of the Earth. The surface 110 may be dry land or ocean bottom. The well system 102 may be for a hydrocarbon well, such as an oil well, a gas well, a gas condensate well, or a mixture of hydrocarbon-bearing fluids. The formation 104 may include different layers of rock having varying characteristics, such as degrees of density, permeability, porosity, and fluid saturations. The formation 104 may include a low-pressure formation (for example, a gas-depleted former hydrocarbon-bearing formation) and a water-bearing formation (for example, fresh water, brine, former waterflood). In the case of the well system 102 being operated as a production well, the well system 102 may facilitate the extraction of hydrocarbons (or "production") from a hydrocarbon-bearing formation. In the case of the well system 102 being operated as an injection well, the well system 102 may facilitate the injection of substances, such as gas or water, into a hydrocarbon-bearing formation.

The well system 102 may include a wellbore 120 and a drilling system 130. "Wellbore" may also be referred to as a "subterranean wellbore" and may be used interchangeably. The wellbore 120 may include a bored hole that extends from the surface 110 into the formation 104. Wellbore 120 is defined by wellbore wall 124. Although shown as a vertical well, wellbore 120 may take a deviated or horizontal configuration and still use similar relative terminology.

The wellbore 120 may be created, for example, by the drilling system 130 boring through the formation 104. The drilling system 130 may include a drilling rig 132 and a drill string 134. The drill string 134 may include a drill pipe 136 and a bottom hole assembly (BHA) 138 which may include a drill bit 140. The BHA may also include drill collars, stabilizers and reamers, among other drilling tools. In some embodiments, the drill bit 140 includes a cutting drill bit having rotating teeth that can bore through the formation 104 to create the wellbore 120.

The wellbore 120 may provide for the circulation of "drilling fluids" or "drilling mud" 500 during drilling operations using a fluid circulation system 160. The terms "drilling fluid" and "drilling mud" refer to fluids, slurries, or muds used in drilling operations downhole, such as during the formation of the wellbore.

Drilling fluid 500 flows downhole through the drill string 134, out of the drill bit 140 (cooling the drill bit 140 at the same time from heat of friction against the face of the wellbore 120), and back uphole through the annulus, which is a space between the drill string 134 and the wellbore wall 124 of the wellbore 120, carrying cuttings and other debris from the bottom of the wellbore 120. Upon reaching the surface 110, the drilling fluid 500 may pass through a drilling fluid return line 162 into a drilling fluid receiving tank 164, where the cuttings are separated from the drilling fluid 500. In the drilling fluid receiving tank 164, the drilling fluid 500 is agitated such that it releases any dissolved gases from the drilling fluid 500. The drilling fluid 500 is passed to the drilling fluid storage tank 166 where it is held until it is pumped back to the drill string 134 via a standpipe 168 and then back downhole once again. Other various mud circulation systems as known in the art may also be used.

Lost circulation, or loss of circulation, is said to have occurred when the drilling fluid 500 flows into formation 104 through fractures 108 instead of returning up the annulus. In the present disclosure, "fractures" may refer to naturally occurring openings or fissures in the formation, fissures created by the drilling activities, or any other features of the formation in the vicinity of the wellbore which allow the migration of the drilling fluid into the formation. The general location where the fluid is being lost into the formation 104 may be referred to as a lost circulation zone 106. The lost circulation zone 106 of the embodiment illustrated in FIG. 2 is located proximate the bottom portion of the wellbore 120. However, lost circulation may occur at any location in the wellbore 120 between the surface 110 and the bottom of the wellbore 120 and thus, any parts of the wellbore 120 where lost circulation is occurring may be considered as the lost circulation zone 106. Lost circulation may be classified under different categories based on the amount of drilling fluid being lost and may include seepage, partial lost returns and total lost returns.

As will be understood by one of ordinary skill in the art, FIG. 2 does not represent the totality of equipment necessary for performing drilling or other downhole operations; rather, the figure is merely illustrative for discussion purposes. Supporting equipment for the system may include additional standard components or equipment that enables and makes operable the described apparatuses, processes, methods, systems, and compositions of matter.

Basaltic Particles

Figure 3A:
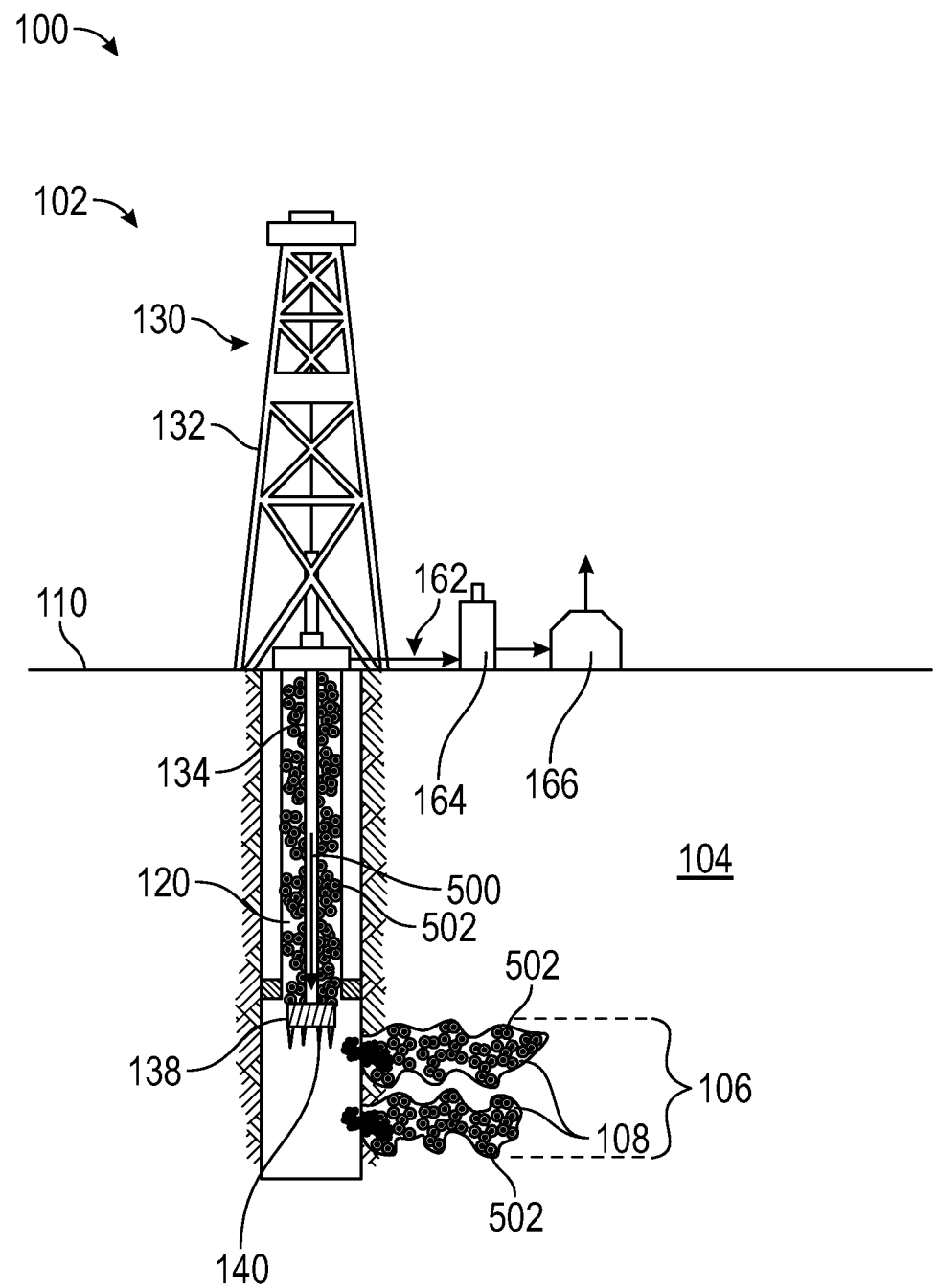
FIG. 3(A)-FIG. 3(C) are diagrams that illustrate the method of mitigating lost circulation in a vertical wellbore in accordance with one or more embodiments.

In one or more embodiments, a method of mitigating lost circulation may include introducing basaltic particles to a lost circulation zone of a subterranean wellbore. FIG. 3(A) illustrates a well environment 100 in which basaltic particles 502 are introduced into the wellbore 120. In some embodiments, the basaltic particles are introduced to the lost circulation zone 106, where a carbonated mixture is also introduced such that dissolution of the basaltic particles and precipitation of carbonate mineral may take place. In other embodiments, basaltic particles may be introduced to the lost circulation zone 106 and other parts in the wellbore.

In the present disclosure, "basaltic particles" refer to any particles that include basalt as a base component. The basaltic particles may include basalt from natural sources, such as volcanic rocks, and may include various types of basalt, such as, but not limited to, tholeiitic basalt, alkali basalt, high-alumina basalt, and boninite. The definition of basalt may be obtained by consulting various classification methods of volcanic rocks, such as Quartz, Alkali feldspar, Plagioclase, Feldspathoid (QAPF) diagrams. In some embodiments, basalt may be an aphanitic, or fine-grained, igneous rock generally containing about 45 wt % to 52 wt % silica, 5-14 wt % FeO, 10 wt % of CaO, 5-12 wt % of MgO, and 14 wt % or more of $Al_2O_3$.

In one or more embodiments, the basaltic particles may include basalt and other components, such as pulverized non-basalt rocks and minerals. In some embodiments, basaltic particles may contain basalt in an amount ranging from a lower limit selected from any of 5 wt %, 10 wt % and 15 wt %, to an upper limit selected from any of 60 wt %, 70 wt %, 80 wt %, 90 wt % and 100 wt %, where any lower limit may be used in combination with any upper limit.

In one or more embodiments, the basaltic particles may be in a form of, but not limited to, nano-sized particles, chips and fibers. The shape of the basaltic particles may be spherical, cubic, cylindrical or any other regular or irregular shapes. In some embodiments, the basaltic particles may have a size ranging from about 1 nm to 20 mm for basaltic particles, such as a lower limit selected from any of 1 nm, 5 nm, 10 nm, 50 nm, and 100 nm to an upper limit selected from any of 0.5 μm, 1 μm, 10 μm, 100 μm, 1 mm, 2 mm, 5 mm, 10 mm and 20 mm, where any lower limit may be used in combination with any upper limit.

Introduction of Basaltic Particles

In some embodiments, the basaltic particles may be introduced to the wellbore, including the lost circulation zone, by incorporating the basaltic particles into a base fluid. A base fluid containing basaltic particles may be referred to as a "basaltic base fluid" The base fluid may be any type of a fluid that is suitable for dispersing the basaltic particles and carrying the basaltic particles to be introduced to the lost circulation zone of the wellbore. In some embodiments, the basaltic base fluid may contain additional fluids or additives.

In some embodiments, the basaltic base fluid may be produced by incorporating the basaltic particles into a drilling fluid. The drilling fluid may be water-based, oil-based or other types of fluid. The drilling fluid may generally contain water, clay and various types of additives. Additives of the drilling fluid may include, but not limited to, barium sulfate, calcium carbonate, thickeners, viscosity modifiers, lubricants, shale inhibitors, weighting agents, deflocculants, emulsifiers and the like.

In one or more embodiments, the basaltic base fluid may contain basaltic particles in an amount ranging from about 1 wt % to 90 wt %. In some embodiments, the basaltic base fluid may contain basaltic particles in an amount ranging from a lower limit selected from any of 1 wt %, 2 wt %, 3 wt %, 4 wt %, and 5 wt % to an upper limit selected from any of 50 wt %, 60 wt %, 70 wt %, 80 wt % and 90 wt %, where any lower limit may be used in combination with any upper limit.

In other embodiments, the basaltic particles may be introduced to the wellbore, including the lost circulation zone, by incorporating the basaltic particles into a part of the drill string. The basaltic particles may be incorporated into any suitable parts of the drill string such that the basaltic particles may be introduced to specific areas of the wellbore, such as the lost circulation zone, where the basaltic particles may come into contact with a carbonated mixture, which is described in detail below. In some embodiments, the basaltic particles may be incorporated into one or more of drill pipe and BHA.

In some embodiments, the basaltic particles may be incorporated into a coating fluid to form a coating composition, and coated onto the drill string or portion thereof. The coating composition may include the basaltic particles, the coating fluid and may also include other components such as additives. In one or more embodiments, the coating fluid may be any fluid that is suitable for dispersing the basaltic particles, and that allows the basaltic particles to be incorporated into the drill string. In one or more embodiments, the coating fluid may be a resin, paint, or adhesive which allow the basaltic particles to be coated onto the drill string and sufficiently adhered onto the drill string such that the basaltic particles may be introduced to a specific location in the wellbore, including the lost circulation zone, without being dislodged accidentally from the drill string. In some embodiments, the basaltic particles may be placed onto the drill string by various methods such as adhering the basaltic particles to the drill string with an adhesive, or securing the basaltic particles onto the drill string mechanically by using securing means such as straps, mesh, or fasteners. In some embodiments, the basaltic particles may be embedded into various parts of the drill string.

Figure 4:
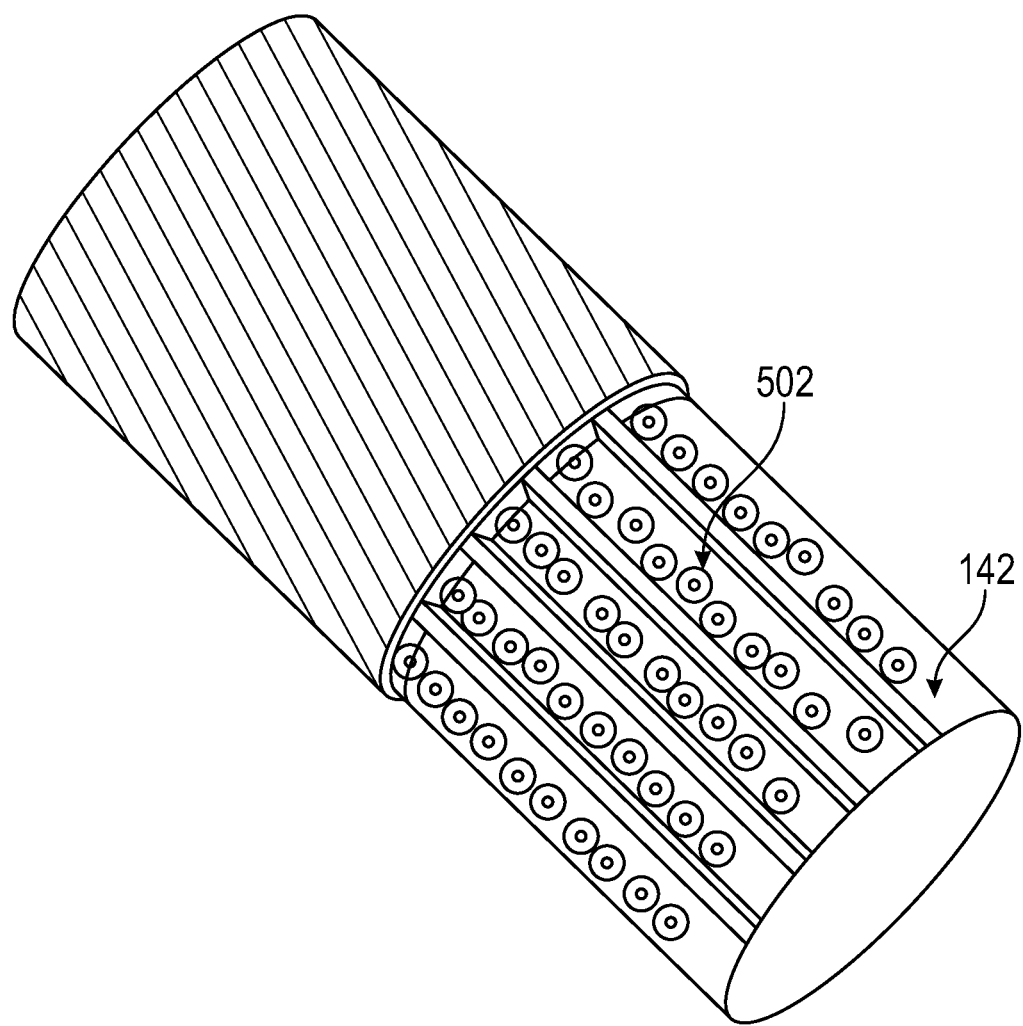
FIG. 4 is a diagram that illustrates a recessed portion of a bottom hole assembly containing basaltic particles in accordance with one or more embodiments.

In one or more embodiments, the basaltic particles may be placed or embedded in a recessed portion on the surface of a part of the BHA. FIG. 4 illustrates the recessed portion of the part of the BHA ("recessed portion" 142) containing basaltic particles 502. In some embodiments, the recessed portion may be, but is not limited to, grooves or holes provided on the surface of a part of the BHA. In other embodiments, the basaltic particles may be emplaced within a sleeve of a tool that may be activated to disperse the basaltic particles when needed for use in remedying lost circulation.

In some embodiments, the method of mitigating lost circulation may include introducing an additive which may accelerate the mitigation of lost circulation. The additive, or a mitigation accelerator, may include ceramic particles which may be excited when a stimulus, such as microwaves, is provided.

In one or more embodiments, the amount of basaltic particles introduced to the wellbore may be adjusted according to the severity of the lost circulation and other operational factors such as, but not limited to, the flow rate and viscosity of the drilling fluid, weight limitation of the drill string, and the like.

Introduction of Carbonated Mixture

In one or more embodiments, a method of mitigating lost circulation may include introducing a carbonated mixture comprising water and carbonate anions to the lost circulation zone of the wellbore.

In some embodiments, the carbonated mixture may be produced by dissolving carbon dioxide into water. Dissolution of carbon dioxide in water may result in the formation of ions including hydrogen cations ($H^+$) and carbonate anions ($CO_3^{2-}$). Water in the carbonated mixture may be fresh water or saltwater, and may be obtained from natural sources or artificially produced. In one or more embodiments, the carbonated mixture may be any fluid that contains water and carbonate anions obtained by dissolving carbon dioxide into the water, and is suitable for being introduced to the wellbore.

In one or more embodiments, the carbonated mixture may be carbonated water produced by dissolving carbon dioxide into water to produce carbonated water, and the carbonated water may be introduced directly into the wellbore. In other embodiments, the carbonated mixture may be a drilling fluid to which the carbonated water is mixed in before or as being introduced the wellbore. In yet other embodiments, the carbonated mixture may be a drilling fluid to which carbon dioxide is directly dissolved in before or as being introduced to the wellbore.

In some embodiments, the carbonated mixture may be introduced to the lost circulation zone after basaltic particles are introduced to the lost circulation zone. The basaltic particles may be introduced to the lost circulation zone in the form of basaltic-base fluid, such as basaltic particles mixed with a drilling fluid, when lost circulation is encountered, and the carbonated mixture may be introduced to the lost circulation zone after the basaltic-base fluid is introduced to the lost circulation zone. In other embodiments, the basaltic particles may be introduced to the lost circulation zone by incorporating into the drill string. Carbonated mixture may be then introduced to the wellbore when lost circulation is encountered. In other embodiments, the carbonated mixture may be introduced to the wellbore before the basaltic-base fluid containing basaltic particles is introduced to the wellbore. In some embodiments, the carbonated mixture may be introduced into the wellbore continuously or intermittently after the lost circulation occurs and until the lost circulation is mitigated.

In one or more embodiments, the carbonated mixture may be acidic and have a pH of about 2.0 to 6.9. In some embodiments, the carbonated mixture may have a pH in a range from a lower limit selected from any of 2.0, 2.5, 3.0, 3.5 and 4.0 to an upper limit selected from any 5.0, 5.5, 6.0, 6.5 and 6.9, where any lower limit may be used in combination with any upper limit.

Dissolution of Basaltic Particles in Carbonated Mixture

In one or more embodiments, the method of mitigating lost circulation may include contacting basaltic particles with a carbonated mixture in the lost circulation zone of the subterranean wellbore. The basaltic particles may contact the carbonated mixture as the basaltic particles and carbonated mixture are introduced to the lost circulation zone. In some embodiments, contacting basaltic particles with carbonated mixture may be achieved by rotating the drill bit to promote mixing and agitation of the basaltic particles and carbonated mixture. The rotational speed of the drill bit may be at any speed provided that the rotation provides adequate mixing and contacting of the basaltic particles with the carbonated water. In some embodiments, the rotational speed of the drill bit may be a maximum rotational speed of the drill bit.

In one or more embodiments, the method of mitigating lost circulation may include dissolving at least a part of the basaltic particles with the carbonated mixture to release divalent cations. The carbonated mixture containing water and carbonate anions may be acidic and may have the following chemical reactions in equilibrium:

$$H_2CO_3(aq) \leftrightarrows H^+(aq) + HCO_3^-(aq) \quad \text{equation 1}$$

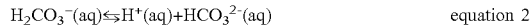

$$H_2CO_3^-(aq) \leftrightarrows H^+(aq) + HCO_3^{2-}(aq) \quad \text{equation 2}$$

$H^+$ ions in the carbonated mixture may then dissolve minerals containing divalent cations in the basaltic particles. Divalent cations refer to cations or positive ions with the valence of 2. Such dissolution of basaltic particles may include, but not limited to, reactions represented by the following:

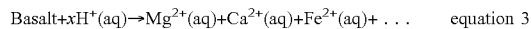

$$\text{Basalt} + xH^+(aq) \rightarrow Mg^{2+}(aq) + Ca^{2+}(aq) + Fe^{2+}(aq) + \ldots \quad \text{equation 3}$$

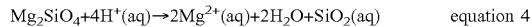

$$Mg_2SiO_4 + 4H^+(aq) \rightarrow 2Mg^{2+}(aq) + 2H_2O + SiO_2(aq) \quad \text{equation 4}$$

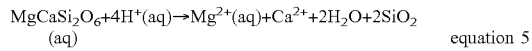

$$MgCaSi_2O_6 + 4H^+(aq) \rightarrow Mg^{2+}(aq) + Ca^{2+} + 2H_2O + 2SiO_2(aq) \quad \text{equation 5}$$

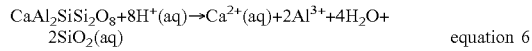

$$CaAl_2SiSi_2O_8 + 8H^+(aq) \rightarrow Ca^{2+}(aq) + 2Al^{3+} + 4H_2O + 2SiO_2(aq) \quad \text{equation 6}$$

In some embodiments, dissolving the basaltic particles with the carbonated mixture may release divalent cations including calcium cations ($Ca^{2+}$), magnesium cations ($Mg^{2+}$) and ferrous cations ($Fe^{2+}$). Dissolving of the basaltic particles and releasing of the divalent cations may generally occur when the basaltic particles contact the carbonated mixture, and may occur in the lost circulation zone.

Stimulation of Basaltic Particles and Carbonated Mixture

Figure 3B:
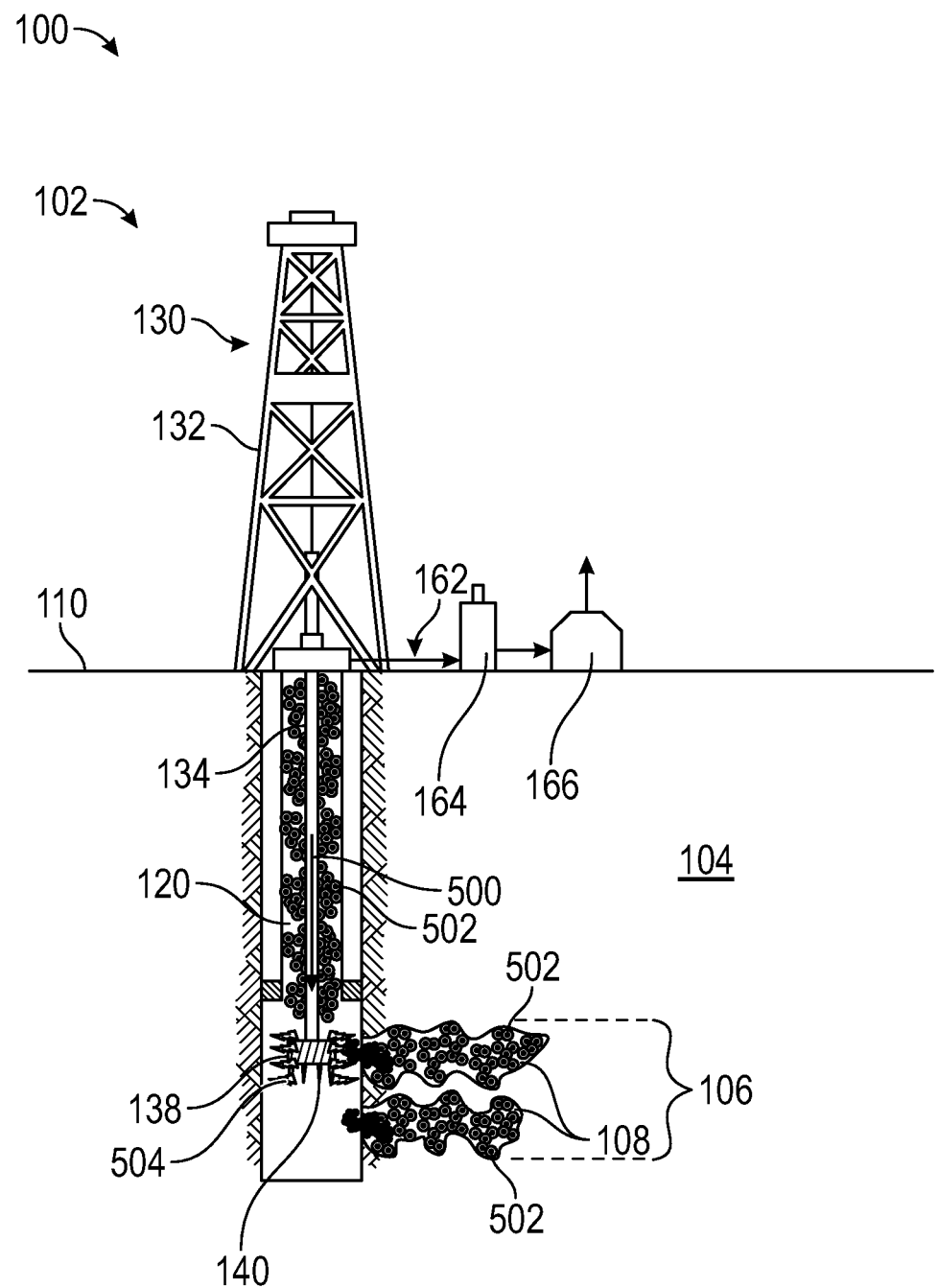

In one or more embodiments, the method of mitigating lost circulation may include providing stimulus to the basaltic particles and the carbonated mixture. Stimulus in the present disclosure may include, but not limited to, a form of energy such as sound energy and motion energy. In some embodiments, the stimulus may promote dissolving of the basaltic particles and reacting of the divalent cations with carbonate anions, which may result in the acceleration of carbonated mineral precipitation process. FIG. 3(B) illustrates a well environment 100 in which the basaltic particles 502 and drilling fluid 500 that may contain carbonated mixture are introduced to the lost circulation zone 106 of the wellbore 120, and a stimulus 504 is being provided.

In some embodiments, the stimulus may be provided as an energy form including one or a combination of infrasonic waves, acoustic waves, ultrasonic waves, and/or microwaves. The stimulus may provide additional agitation to the basaltic particles and carbonated mixture to promote the mixing and contacting of $H^+$ ions with the basaltic particles, contacting of divalent cations with carbonate anions, and migration of $H^+$ ions into the cavities of basaltic particles to increase the dissolution rate of the basaltic particles.

In one or more embodiments, the stimulus may be provided by a stimulus generator, such as an acoustic wave generator, infrasonic wave generator, ultrasonic wave generator, or microwave generator incorporated into the drill string. Such generator may be incorporated into any suitable portion of the drill string including the bottom hole assembly. The stimulus may be provided continuously, or intermittently. There is no limitation on the duration and timing of the stimulation process and the strength of the provided stimulus, and they may be adjusted and optimized based on the specific conditions of the lost circulation.

In some embodiments, the stimulus may be provided while rotating the drill bit, which may provide additional stimulus. In some embodiments, the drill bit may be operated at a substantially high rotational speed to provide additional agitation of the basaltic particles and carbonated mixture.

Precipitation of Carbonate Minerals

In one or more embodiments, the method of mitigating lost circulation may include reacting the divalent cations released from the basaltic particles with carbonate anions ($CO_3^{2-}$) in the carbonated mixture to produce carbonate minerals. Carbonate minerals refer to any compounds that contain at least a carbonate group and are insoluble in water. Compounds "insoluble in water" in the present disclosure include compounds that are completely insoluble in water, and compounds that are slightly soluble in water, such as less than 1 part, less than 0.5 part, less than 0.1 part, less than 0.01 part, less than 0.001 part is soluble in 100 parts of water.

Figure 3C:
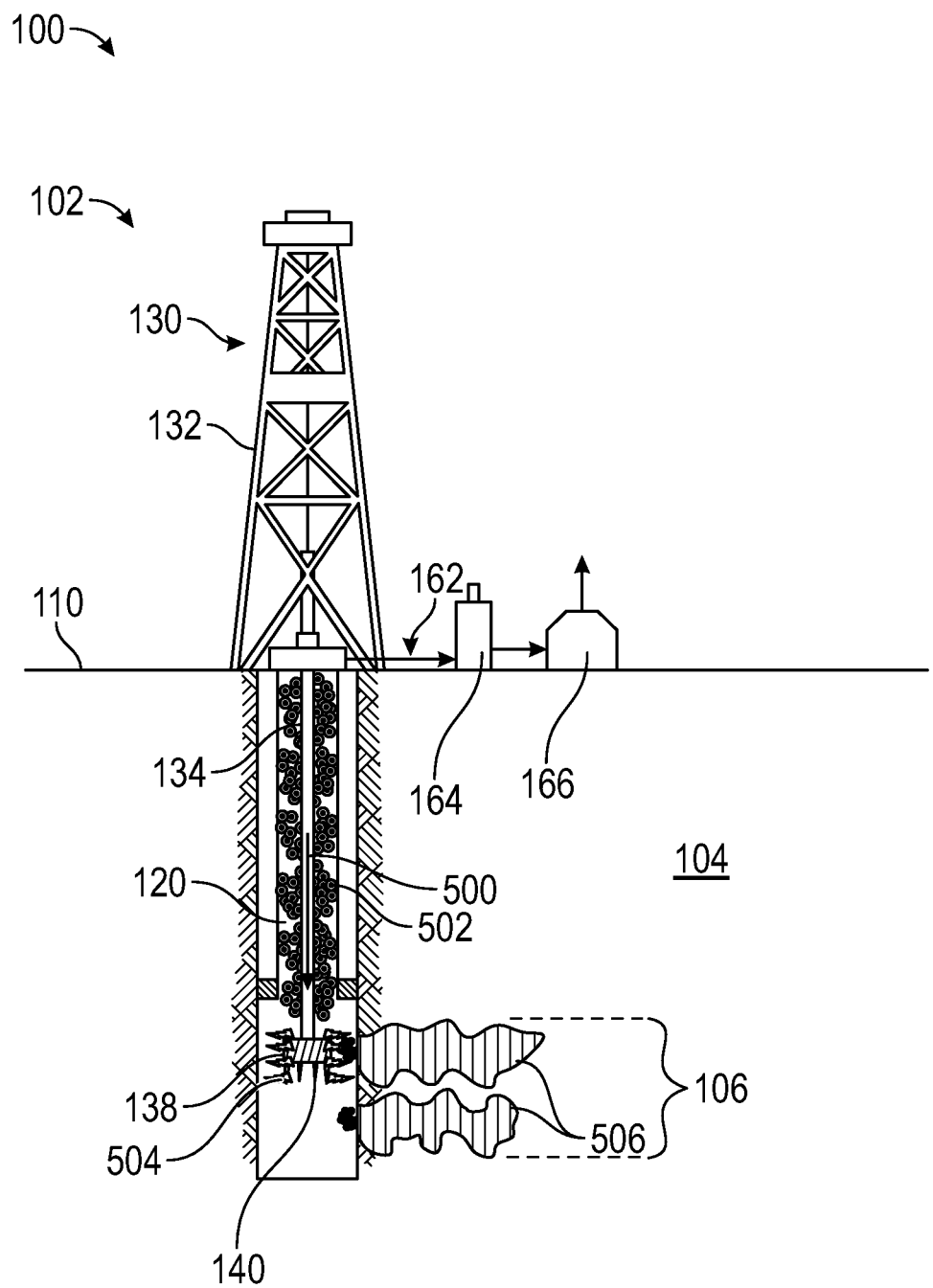

In one or more embodiments, divalent cations, such as $Ca^{2+}$, $Mg^{2+}$, $Fe^{2+}$, may react with $CO_3^{2-}$ in the carbonated mixture upon contact and produce carbonate minerals including calcium carbonate, magnesium carbonate and ferrous carbonate. Because the carbonate minerals are insoluble in water, the carbonate minerals precipitate upon formation. In some embodiments, at least a part of the precipitated carbonate minerals are deposited in various parts of the lost circulation zone, including fractures where the drilling fluid is being lost into the formation. In one or more embodiments, such deposits of carbonate minerals may act as a "plug" and seal the fractures, mitigating the lost circulation. In one or more embodiments, "mitigating" the lost circulation may include stopping the loss of fluid into the formation, or reducing the severity of the fluid loss such that drilling operation may be resumed. FIG. 3(C) illustrates a well environment 100 in which the formation 104 has sealed fractures 506, mitigating the lost circulation. The sealed fractures 506 is obtained as a result of the carbonate minerals depositing in the fractures in the lost circulation zone 106.

In some embodiments, the reaction of divalent cations and carbonate anions may occur immediately after the divalent cations are released from the basaltic particles. In other embodiments, stimulus may be required in order to promote contacting of basaltic particles and carbonate mixture, and dissolving of the basaltic particles such that the reaction rate of divalent cations and carbonate anions may be increased.

Monitoring of Carbonate Mineral Precipitation

In one or more embodiments, the method of mitigating lost circulation may include monitoring a lost circulation mitigation process ("monitoring" or "monitoring process") which may include obtaining information regarding the reaction process of divalent cations and carbonate anions and the depositing process of the carbonate mineral. In some embodiments, the monitoring process may include obtaining information regarding the reaction rate of the divalent cations and carbonate anions, and the rate of carbonate mineral precipitation. Such information may be used to determine whether additional basaltic particles, carbonated mixture and/or stimulus are required in order to maintain, accelerate and/or complete the lost circulation mitigation process.

In some embodiments, the monitoring may include collecting samples and manually conducting various tests to obtain necessary information to assess the reaction and precipitation processes. In one or more embodiments, the monitoring may include collecting samples of the drilling fluid and conducting tests to obtain properties such as the amount of carbonate mineral, divalent cations and carbonate anions in the drilling fluid, and the pH of the drilling fluid. In other embodiments, the monitoring may include measuring the amount of drilling fluid introduced to the wellbore and the amount returning to assess the level of lost circulation.

In other embodiments, the monitoring may include incorporating downhole sensors into the drill string and obtaining properties such as the amount of carbonate mineral, divalent cations and carbonate anions in the fluid such as drilling fluid and carbonated mixture, and the pH of the drilling fluid. In some embodiments, the monitoring may include observing the precipitation process of carbonate mineral in the lost circulation zone by using sensors such as thermal and ultrasonic sensors. The monitoring may be continuous or intermittent.

In one or more embodiments, the monitoring may provide information which may be used to adjust the amount of basaltic particles and carbonated mixture to be introduced to the lost circulation zone, and the strength of the stimulus and the duration of the stimulus provision.

In some embodiments, the method of mitigating lost circulation may include, as an option, repeating one or more of introducing basaltic particles, introducing carbonate mixture, contacting, dissolving, reacting, providing stimulus, depositing carbonate mineral and monitoring. In some embodiments, the repeating process may include all steps included in the method of mitigating lost circulation. In other embodiments, selective steps of the method may be repeated. The number of repeats is not limited and may be repeated as many times as necessary until the lost circulation is mitigated. Each repeated process may be the same as the previous iteration, or may be different, and may be adjust in accordance with a specific condition of the lost circulation.

In some embodiments, the method of mitigating lost circulation may be conducted without stopping the drilling operation, or with a minimal disruption. A "minimal disruption" may include halting the drilling operation for a short period of time, such as 5 minutes, 10 minutes, 30 minutes, 1 hour, 2 hours, 5 hours, or 10 hours. The minimal disruption may also include retrieving the drill string and deploying back to its original position once, twice or three times such that a portion of the drill string containing the basaltic particles and the source of stimulus may be moved to the vicinity of the lost circulation zone to complete the mitigation of lost circulation.

In some embodiments, the lost circulation zone may be located near the portion of the drill string containing basaltic particles, in case the basaltic particles are provided by the drill string, and the source of the stimulus, such that the mitigation of lost circulation may be conducted without stopping the drilling operation. In such embodiments, retrieval and deployment of the drill string is not required.

In some embodiments, the method of mitigating lost circulation may be conducted by incorporating a lost circulation mitigation device ("a mitigation device"), which may be designed to provide basaltic particles and/or stimulus to a lost circulation zone. The mitigation device may be incorporated into, or disposed on or along, any portion of the drill string, and the mitigation device may be fixed in one location (a "stationary mitigation device"), or may be mobile and transfer to any portion of the drill string as necessary (a "mobile mitigation device").

Figure 5A:
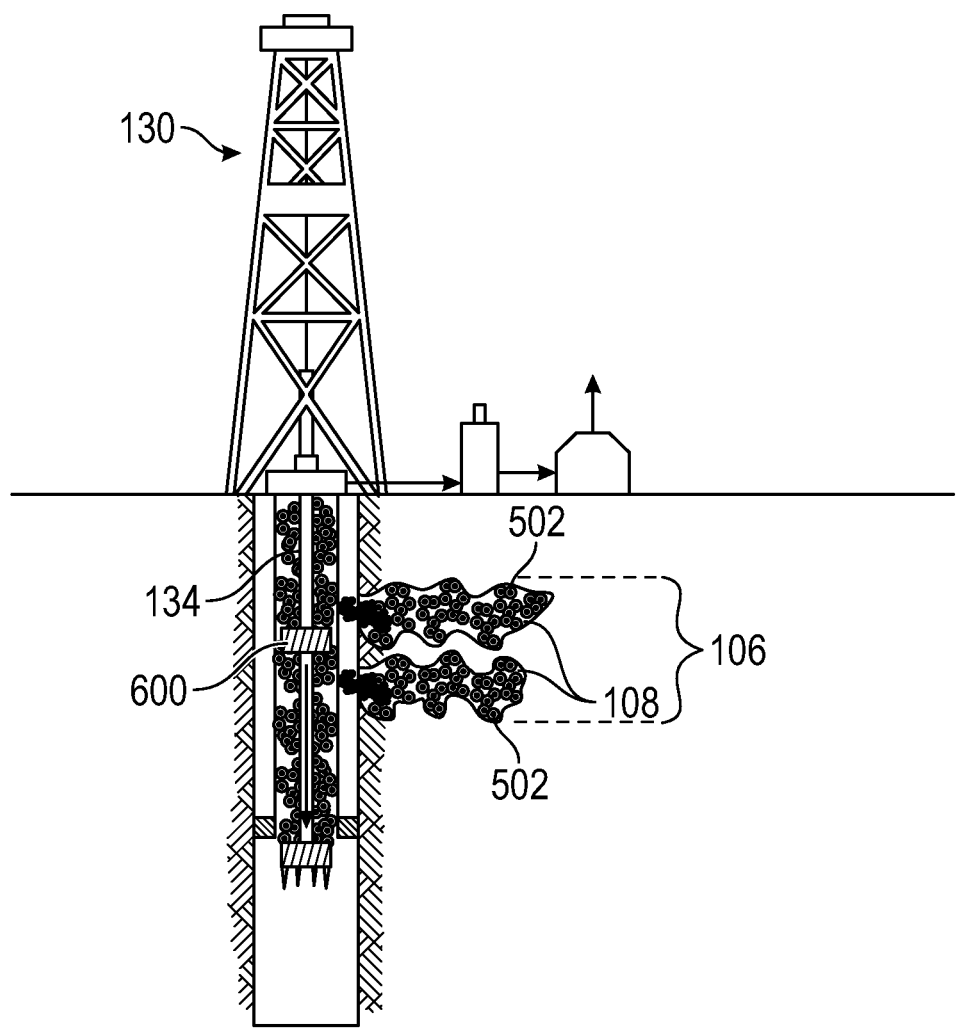
FIG. 5(A)-FIG. 5(C) are diagrams that illustrate the method of mitigating lost circulation in a vertical wellbore being conducted without stopping the drilling operation and with the use of a mitigation device, in accordance with one or more embodiments.
Figure 5B:
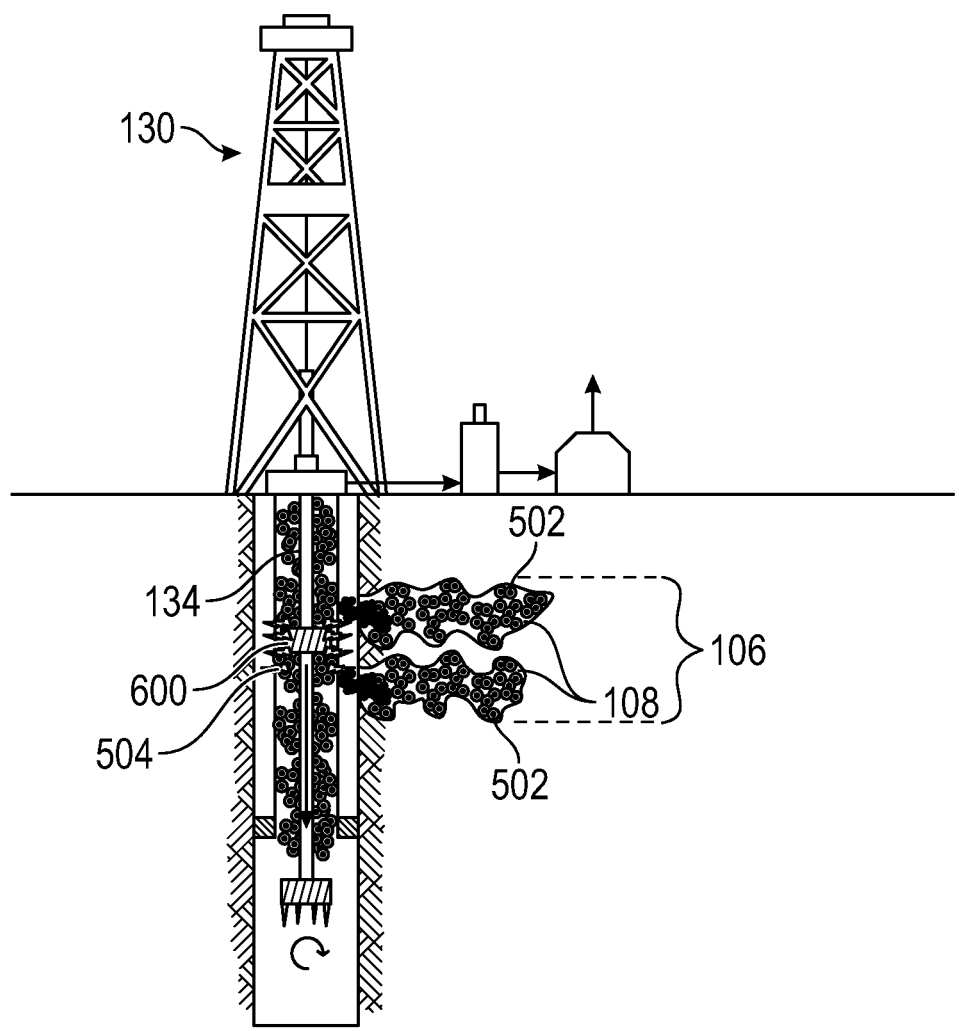
Figure 5C:
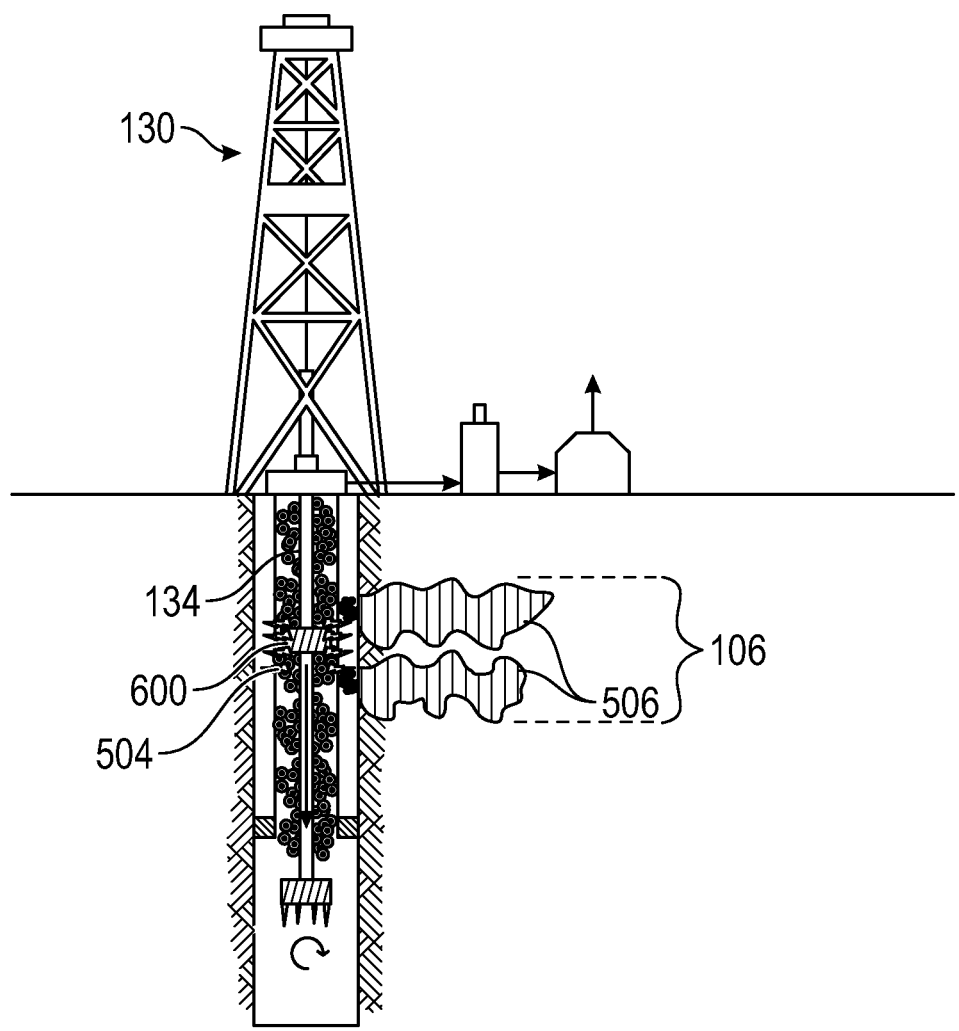

FIGS. 5(A)-(C) illustrate a drilling system 130 having a drill string 134 containing the mitigation device 600. FIG. 5(A) shows a lost circulation zone 106 formed near the mitigation device 600. In such a configuration, mitigation of lost circulation may be conducted without retrieving the drill string 134, as the mitigation device 600 may be used to introduce the basaltic particles 502 and provide stimulus 504 to the lost circulation zone 106, as shown in FIGS. 5(B)-5(C). In some embodiments, the mitigation of lost circulation may be conducted without stopping the drilling operation or with a minimal disruption, by incorporating a mobile mitigation device, regardless of the location of the lost circulation zone in the wellbore.

In some embodiments, the drill string may contain a plurality of mitigation devices such that the distance of drill string retrieval/deployment may be reduced if the mitigation devices are fixed to the drill string, or the distance which the mitigation devices need to travel may be reduced, if the mitigation devices are mobile.

Figure 6A:
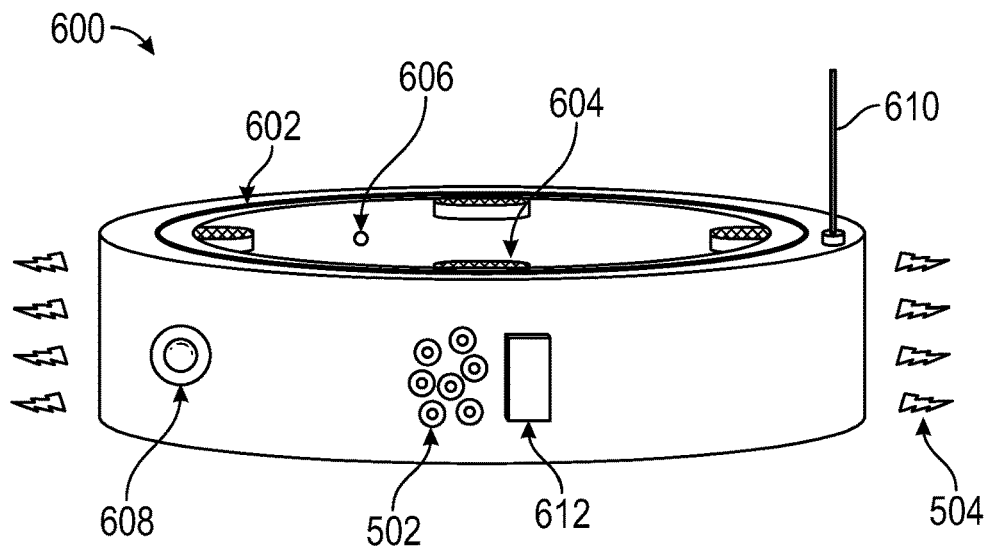
FIG. 6(A)-FIG. 6(B) are diagrams that illustrate a mitigation device in accordance with one or more embodiments.
Figure 6B:
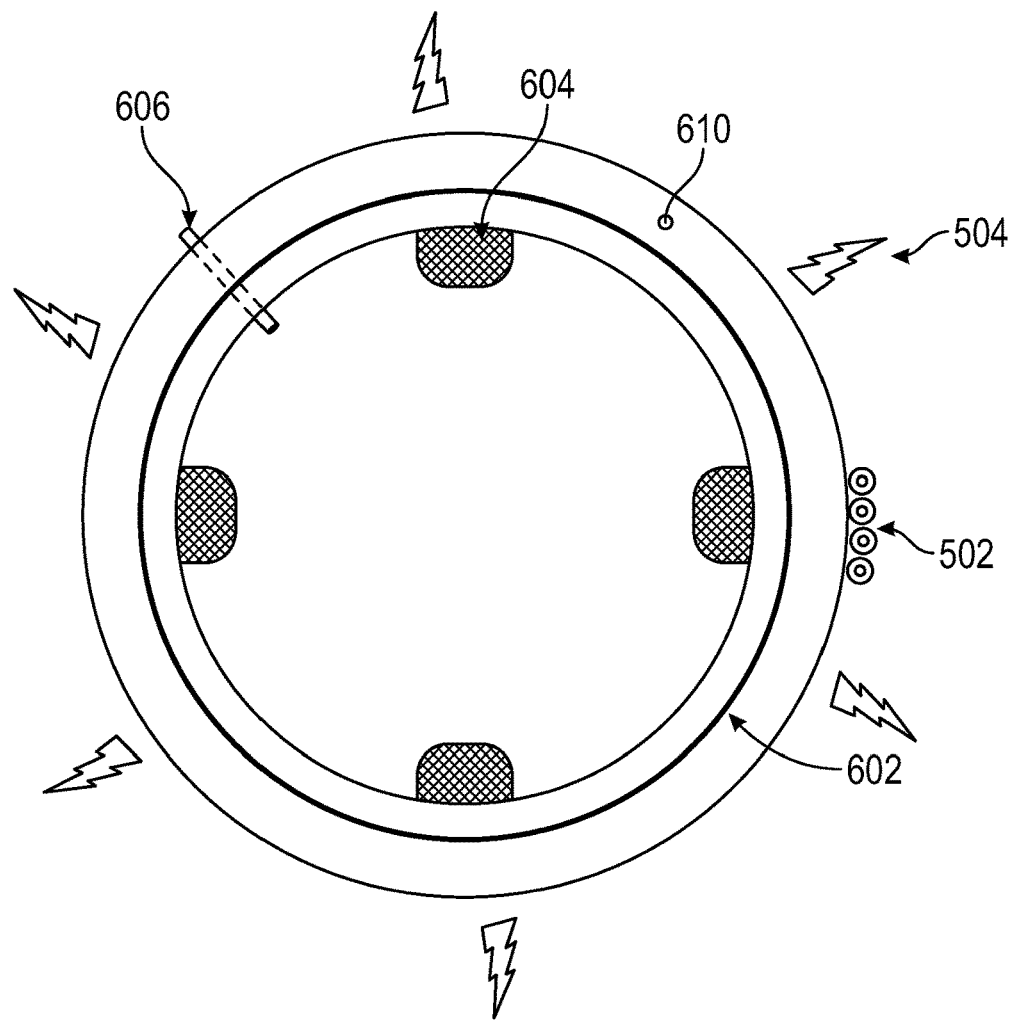

In some embodiments, the mitigation device may have a shape of a ring and may be placed around an outer surface of the drill string. FIGS. 6(A)-(B) illustrates an exemplary mitigation device 600. The mitigation device 600 may include basaltic particles 502 and a stimulus generator 602 which provides stimulus 504 in mainly the radial direction of the mitigation device 600. The mitigation device 600 may include wheels 604 (bearings 604) which assist the transfer of the mitigation device 600 along the drill string. The mitigation device 600 may also include one or more of a lock 606, sensors 608, a retrieval/deployment line 610, and a motor 612.

In some embodiments, the stimulus generator of the mitigation device may include an acoustic wave generator, infrasonic wave generator, ultrasonic wave generator, or microwave generator.

In some embodiments, the mitigation device may be a mobile mitigation device capable of transferring, or moving, to any location along the drill string. The mobile mitigation device may be moved as necessary or selectively, depending on the condition and the location of the lost circulation. The movement of the mobile mitigation device may be controlled mechanically by a retrieval/deployment line connected to the mitigation device and a line retrieval/deployment means such as a reel or a winch.

In one or more embodiments, the wheels of the mitigation device may have a spherical shape, a disk shape, or any other shapes which allow the transfer of the mitigation device along the drill string. In some embodiments, disk-shape wheels may be configured to rotate such that the wheels may align in the parallel or perpendicular direction to the drill string in order to allow the mitigation device to move in the longitudinal and rotate in the circumferential direction of the drill string.

In other embodiments, the movement of the mitigation device may be controlled by a motor contained in the mitigation device. The motor may be connected to the wheels of the mitigation device such that the wheels may be driven by the motor to move the mitigation device along the drill string. The motor may be connected to a powerline, or may contain a battery. The mitigation device may include a lock which may be activated when the mitigation device is in a stationary position, such as during the process of mitigating lost circulation.

In some embodiments, the mitigation device may contain basaltic particles. There is no limitation on how the basaltic particles may be incorporated into the mitigation device. The basaltic particles may be placed or embedded on the surface of the mitigation device, or may be incorporated into a coating fluid and coated onto the mitigation device. In other embodiments, the basaltic particles may be contained in a recessed portion of the mitigation device, or a compartment which may have a shieling means, such as a sliding sleeve or a door, to control the exposure of the basaltic particles to the carbonated mixture or drilling fluid as desired.

In some embodiments, the mitigation device may contain sensors which may include one or more of a camera, scanner, logging and scanning ring, hole caliper, or any other devices which may be used to measure or record various aspects of the downhole environment and the mitigation process of the lost circulation. In some embodiments, the monitoring of the lost circulation mitigation may be conducted by the sensors included in the mitigation device.

Figure 7A:
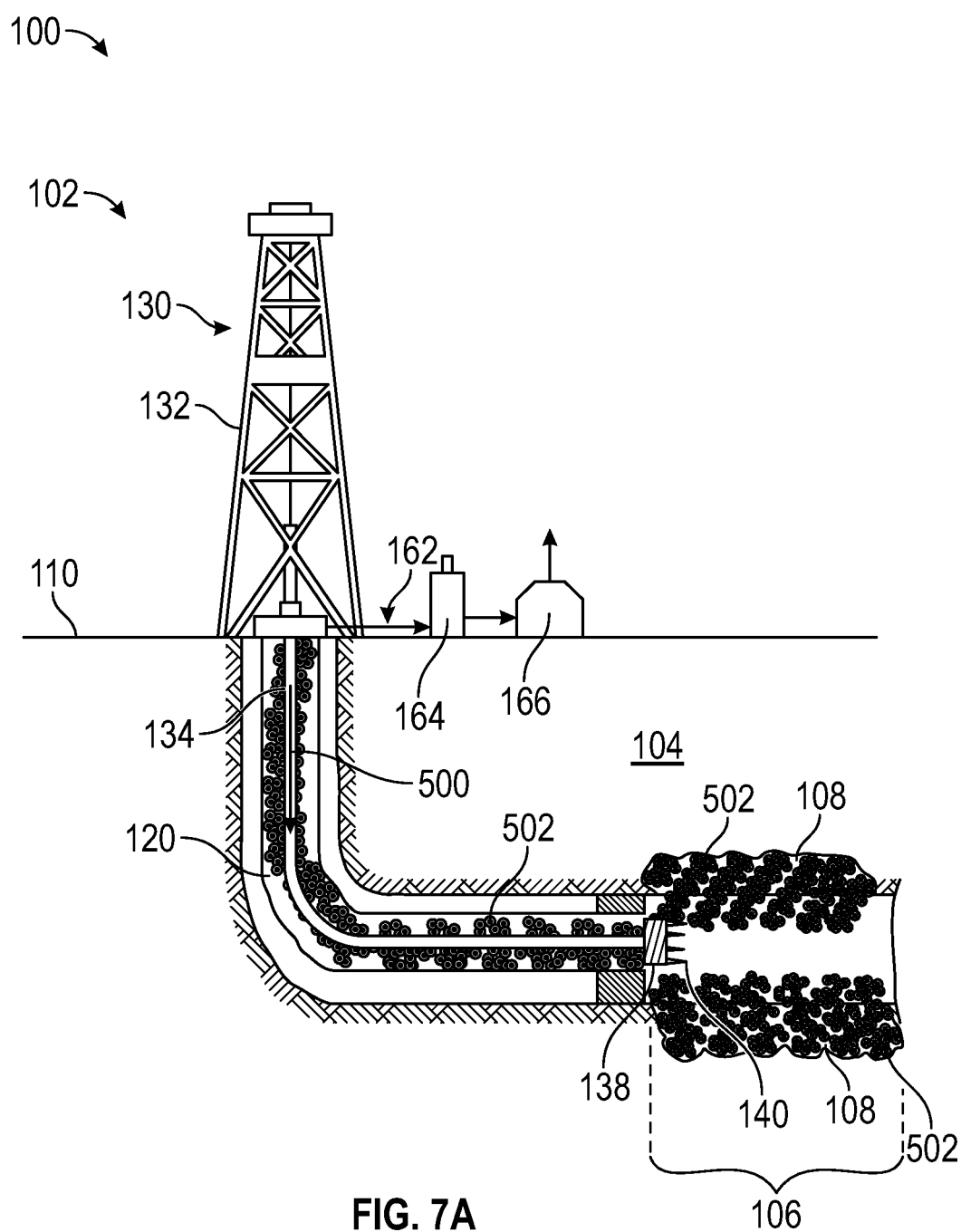
FIG. 7(A)-FIG. 7(C) are diagrams that illustrate the method of mitigating lost circulation in a horizontal wellbore in accordance with one or more embodiments.
Figure 7B:
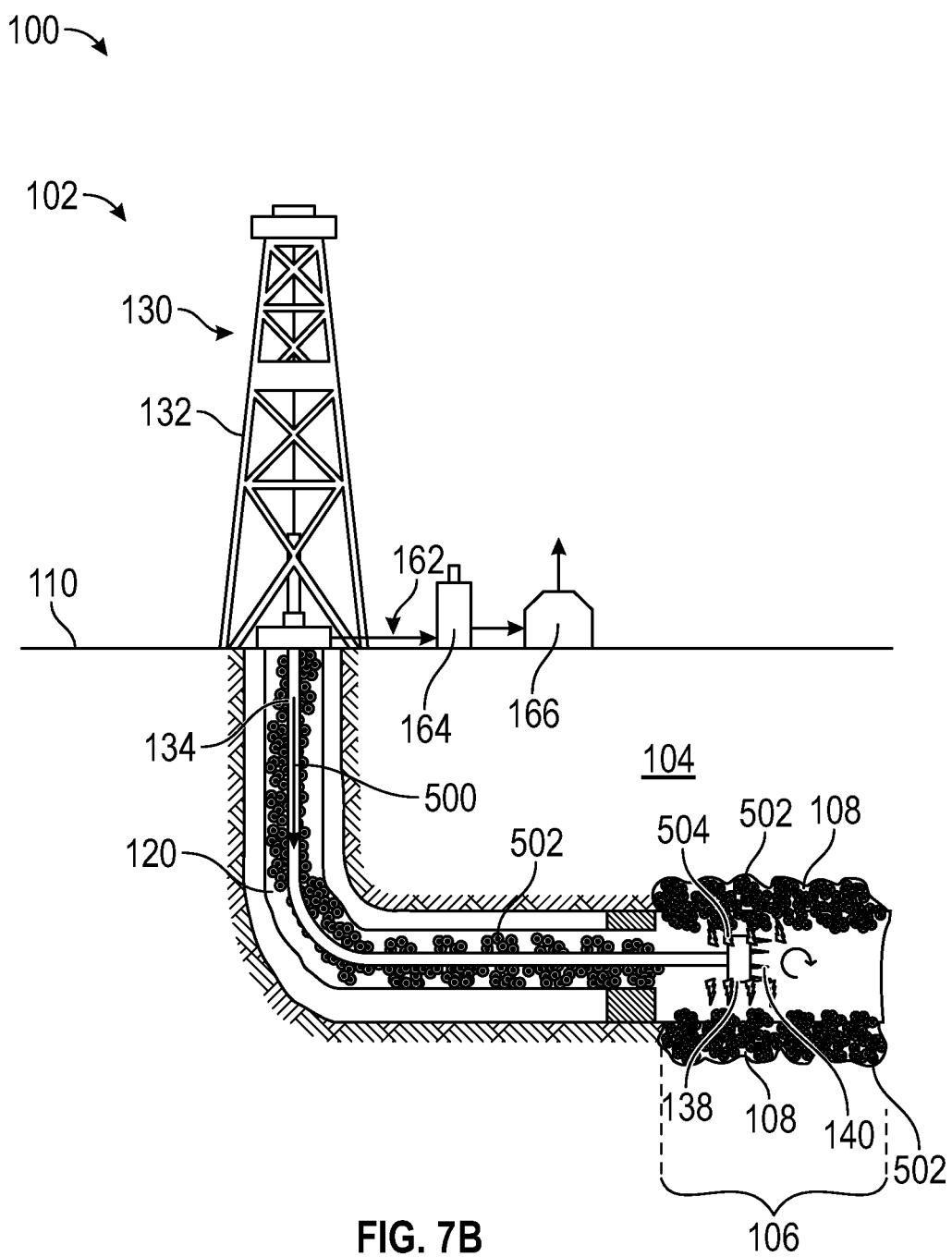
Figure 7C:
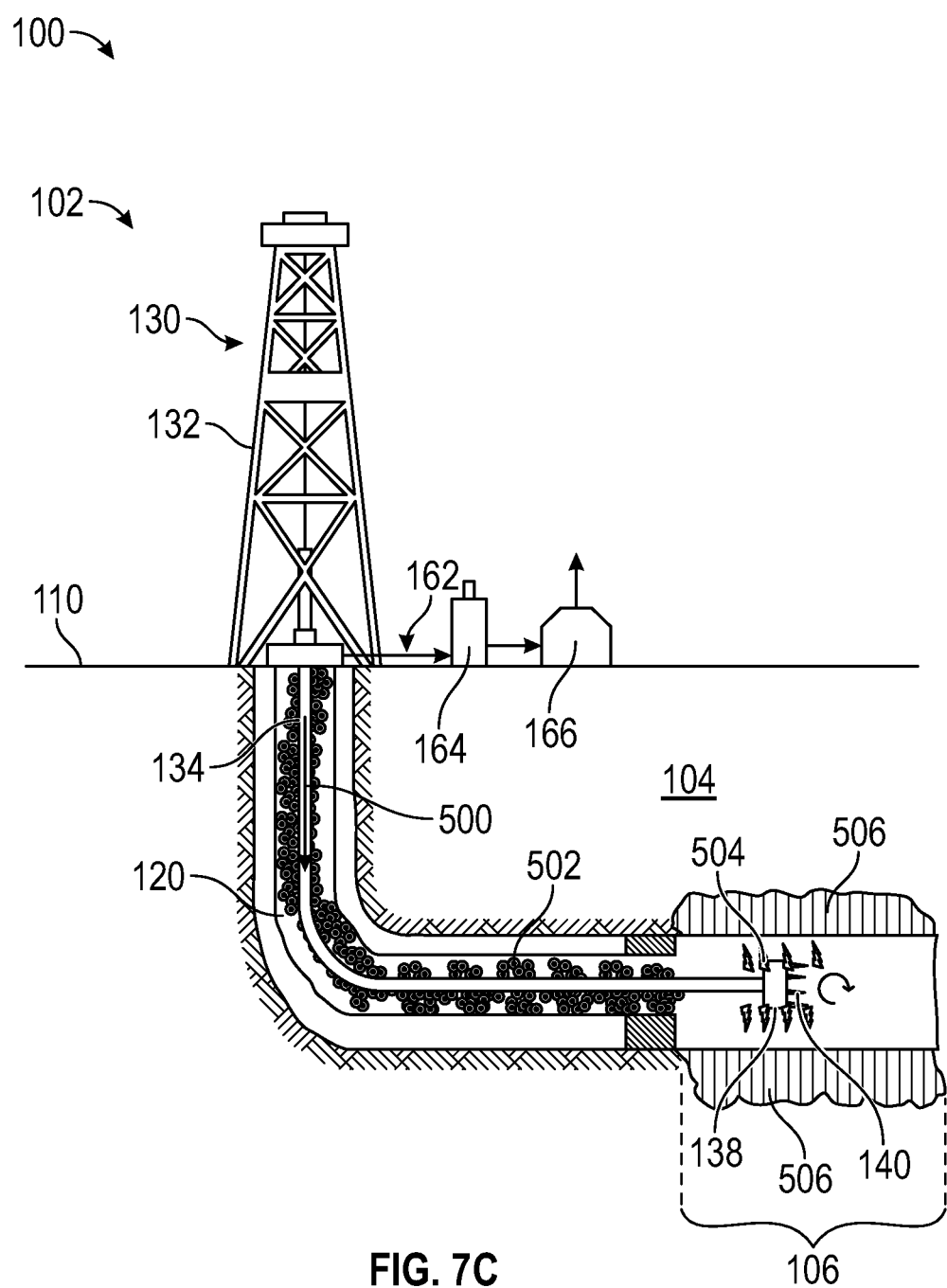
Figure 8A:
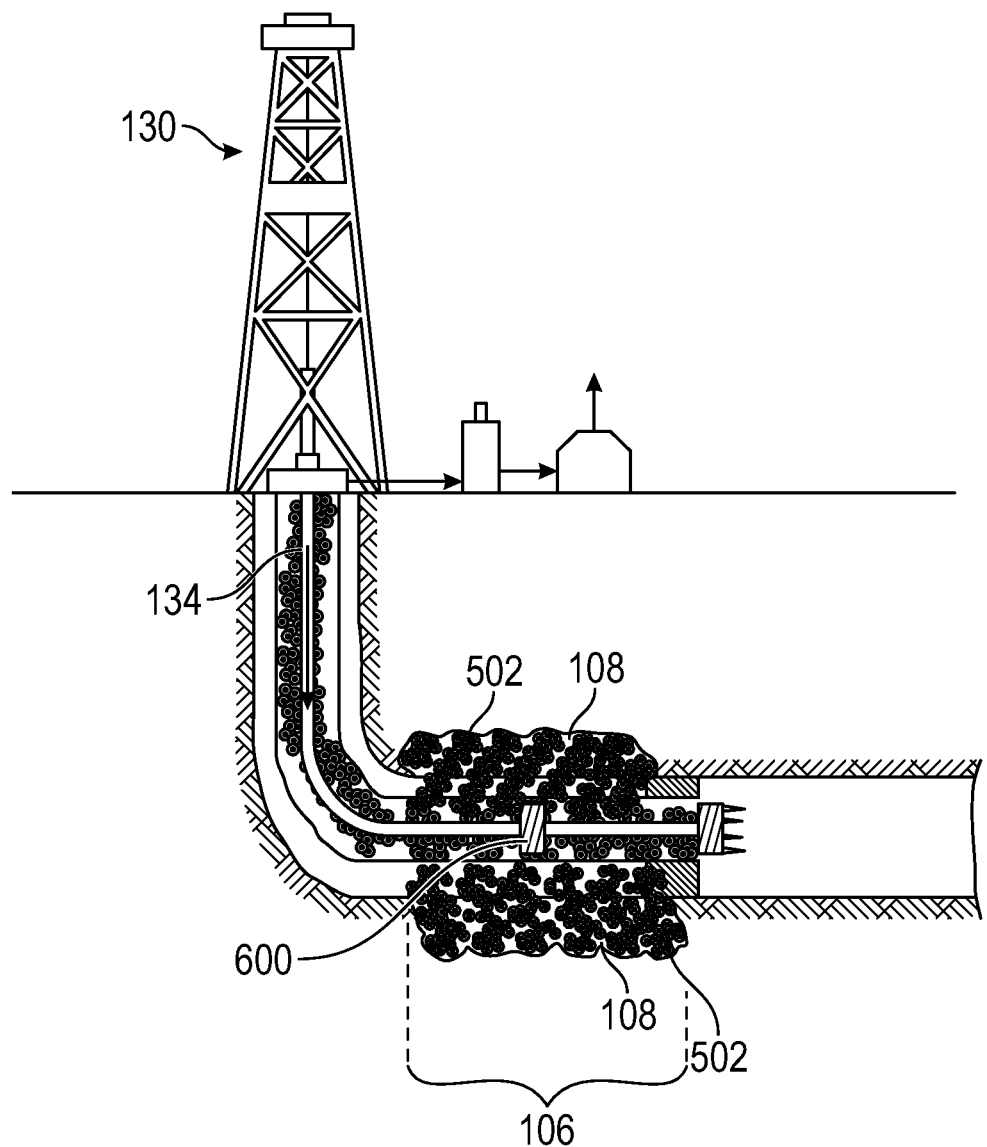
FIG. 8(A)-FIG. 8(C) are diagrams that illustrate the method of mitigating lost circulation in a horizontal wellbore being conducted without stopping the drilling operation and with the use of a mitigation device, in accordance with one or more embodiments.
Figure 8B:
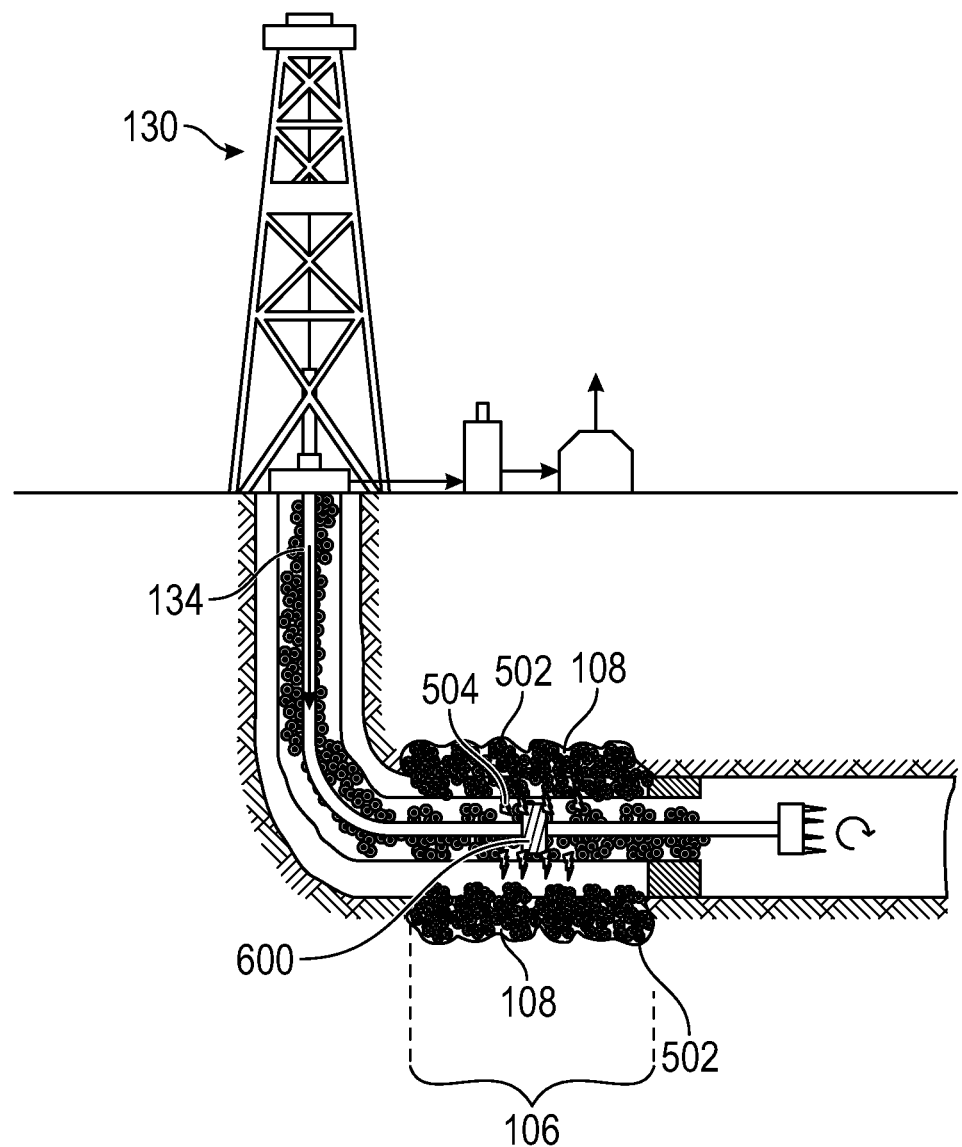
Figure 8C:
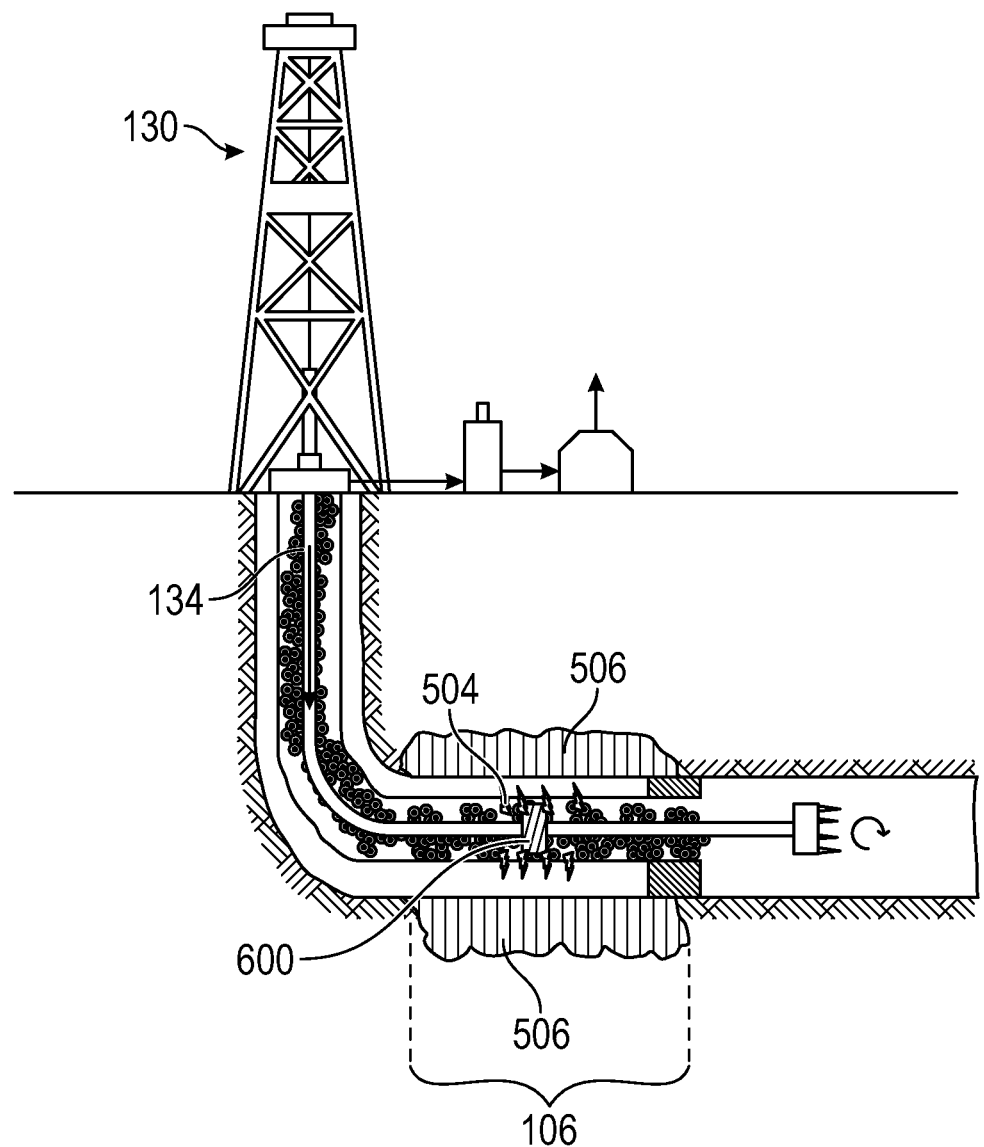

FIG. 7(A)-FIG. 7(C) illustrate a method of mitigating lost circulation in a horizontal wellbore in accordance with one or more embodiments, and FIG. 8(A)-FIG. 8(C) show the method of mitigating lost circulation in a horizontal wellbore without stopping the drilling operation, and with the use of a mitigation device. The method of mitigating lost circulation described in the previous paragraphs may be applied to a vertical wellbore or a horizontal wellbore.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method of mitigating lost circulation in a subterranean wellbore for oil and gas extraction, the method comprising:
   introducing basaltic particles to a lost circulation zone of the subterranean wellbore;
   introducing a carbonated mixture comprising water and carbonate anions to the lost circulation zone of the subterranean wellbore;
   contacting the basaltic particles with the carbonated mixture;
   dissolving at least a part of the basaltic particles with the carbonated mixture to release divalent cations including calcium cations, magnesium cations and ferrous cations;
   reacting, in the lost circulation zone of the subterranean wellbore, the divalent cations with the carbonate anions in the carbonated mixture to produce carbonate minerals;
   providing stimulus to the basaltic particles and the carbonated mixture to promote the dissolving and the reacting;
   depositing at least a part of the carbonate minerals to fractures of the lost circulation zone to stop the lost circulation;
   monitoring the reacting of the divalent cations with the carbonated anions and depositing; and
   repeating one or more of the introducing the basaltic particles, the introducing the carbonated mixture, the dissolving, the reacting, the providing the stimulus, the depositing, and the monitoring, until the lost circulation is mitigated,
   wherein the carbonate anions are formed by dissolving carbon dioxide in water,
   wherein the stimulus comprises at least one of infrasonic wave, acoustic wave, ultrasonic wave, or microwave.

2. The method of claim 1, wherein the introducing basaltic particles includes introducing a drilling fluid comprising the basaltic particles.

3. The method of claim 1, wherein the introducing basaltic particles includes incorporating the basaltic particles into a drill string.

4. The method of claim 3, wherein the introducing basaltic particles includes incorporating the basaltic particles into at least one of a drill pipe, a drilling tool, or a bottom hole assembly of the drill string.

5. The method of claim 3, wherein the incorporating includes coating the drill string with a coating composition comprising the basaltic particles.

6. The method of claim 3, wherein the incorporating includes placing the basaltic particles onto at least a portion of the drill string.

7. The method of claim 4, wherein the incorporating basaltic particles includes placing the basaltic particles in a recessed portion of a part of the bottom hole assembly.

8. The method of claim 1, wherein the carbonated mixture is a drilling fluid comprising the carbonate anions formed by dissolving carbon dioxide into the drilling fluid.

9. The method of claim 1, wherein the carbonated mixture has a pH from 2.0 to 6.9.

10. The method of claim 1, wherein a size of the basaltic particles is in a range from 1 nm to 20 mm.

11. The method of claim 1, wherein the stimulus is provided by at least one of infrasonic generator, acoustic wave generator, ultrasonic generator, or a microwave generator incorporated in a drill string.

12. The method of claim 1, wherein the stimulus is provided while rotating a drill bit.

13. The method of claim 1, wherein the carbonate minerals include calcium carbonate, magnesium carbonate or ferrous carbonate.

14. The method of claim 1, further comprising introducing a mitigation accelerator to the lost circulation zone of the subterranean wellbore.

15. The method of claim 1, wherein the method is conducted without stopping a drilling operation.

16. The method of claim 1, wherein at least one of the introducing the basaltic particles, the providing stimulus and the monitoring is performed by one or more mitigation devices incorporated into a drill string.

17. The method of claim 16, wherein the mitigation device is a mobile mitigation device, the method further comprising moving the mobile mitigation device to a position along the drill string proximate the lost circulation zone.

\* \* \* \* \*